United States Patent
Manohar et al.

(10) Patent No.: US 8,555,359 B2
(45) Date of Patent: Oct. 8, 2013

(54) SYSTEM AND METHODS FOR AUTOMATICALLY ACCESSING A WEB SITE ON BEHALF OF A CLIENT

(75) Inventors: Pradheesh Manohar, Tamil Nadu (IN); Prashant Nalwaya, Rajasthan (IN); Prashant Kumar Agrawal, Karnataka (IN)

(73) Assignee: Yodlee, Inc., Redwood City, CA (US)

( * ) Notice: Subject to any disclaimer, the term of this patent is extended or adjusted under 35 U.S.C. 154(b) by 815 days.

(21) Appl. No.: 12/393,790

(22) Filed: Feb. 26, 2009

(65) Prior Publication Data

US 2010/0215270 A1 Aug. 26, 2010

(51) Int. Cl.
*G06F 21/00* (2006.01)

(52) U.S. Cl.
USPC .................................................. 726/7; 726/27

(58) Field of Classification Search
USPC ......... 726/2–4, 7, 26–28; 715/773; 382/177, 382/218
See application file for complete search history.

(56) References Cited

U.S. PATENT DOCUMENTS

| | | |
|---|---|---|
| 4,727,243 A | 2/1988 | Savar |
| 4,987,538 A | 1/1991 | Johnson et al. |
| 5,220,501 A | 6/1993 | Lawlor et al. |
| 5,237,499 A | 8/1993 | Garback |
| 5,318,007 A | 6/1994 | Afshar |
| 5,340,537 A | 8/1994 | Barrett |
| 5,347,632 A | 9/1994 | Filepp et al. |
| 5,423,033 A | 6/1995 | Yuen |
| 5,446,891 A | 8/1995 | Kaplan et al. |
| 5,459,306 A | 10/1995 | Stein et al. |
| 5,481,672 A | 1/1996 | Okuno et al. |
| 5,483,445 A | 1/1996 | Pickering |
| 5,537,314 A | 7/1996 | Kanter |
| 5,590,196 A | 12/1996 | Moreau |

(Continued)

FOREIGN PATENT DOCUMENTS

| | | |
|---|---|---|
| EP | 0747843 | 12/1996 |
| EP | 0786728 | 7/1997 |

(Continued)

OTHER PUBLICATIONS

Notice of Motion, Motion and Memorandum of Points and Authorities in Support of Defendant Cashedge, Inc.'s Motion for Leave to File First Amended Answer and Counterclaims, U.S. District Court, N.D., California, *Yodlee v. Cashedge, Inc.*, Case No. C-05-01550, May 15, 2007.

(Continued)

*Primary Examiner* — Hadi Armouche
(74) *Attorney, Agent, or Firm* — Donald R. Boys; Central Coast Patent Agency, Inc.

(57) ABSTRACT

A system for performing an automated network-based login procedure on an interactive keypad image includes a software agent executable from a digital medium connected to the network for navigating to a login page, accessing the keypad image, and performing an automated login, and an automated login support application executable from the same or a different digital medium connected to the network, the support application including at least an image processor, an optical character recognizer, and an image data encoder and decoder. The software agent performs a login at the virtual keypad image based on character image matching and location information acquisition for each character of a client's specific set of credential characters included in the image of the keypad.

10 Claims, 4 Drawing Sheets

(56) References Cited

U.S. PATENT DOCUMENTS

| | | |
|---|---|---|
| 5,611,048 A | 3/1997 | Jacobs et al. |
| 5,613,012 A | 3/1997 | Hoffman et al. |
| 5,619,648 A | 4/1997 | Canale et al. |
| 5,619,716 A | 4/1997 | Nonaka et al. |
| 5,634,127 A | 5/1997 | Cloud et al. |
| 5,640,577 A | 6/1997 | Scharmer |
| 5,644,576 A | 7/1997 | Bauchot et al. |
| 5,649,118 A | 7/1997 | Carlisle et al. |
| 5,649,186 A | 7/1997 | Ferguson |
| 5,655,089 A | 8/1997 | Bucci |
| 5,696,965 A | 12/1997 | Dedrick |
| 5,699,528 A | 12/1997 | Hogan |
| 5,701,451 A | 12/1997 | Rogers et al. |
| 5,706,442 A | 1/1998 | Anderson et al. |
| 5,708,825 A | 1/1998 | Sotomayor |
| 5,710,887 A | 1/1998 | Chellish et al. |
| 5,710,918 A | 1/1998 | Lagarde et al. |
| 5,712,979 A | 1/1998 | Graber et al. |
| 5,717,923 A | 2/1998 | Dedrick |
| 5,721,908 A | 2/1998 | Lagarde et al. |
| 5,724,567 A | 3/1998 | Rose et al. |
| 5,724,595 A | 3/1998 | Gentner |
| 5,727,156 A | 3/1998 | Herr-Hoyman et al. |
| 5,732,074 A | 3/1998 | Spaur et al. |
| 5,740,365 A | 4/1998 | Pfeiffer et al. |
| 5,740,549 A | 4/1998 | Reilly et al. |
| 5,745,754 A | 4/1998 | Lagarde et al. |
| 5,745,884 A | 4/1998 | Carnegie et al. |
| 5,752,246 A | 5/1998 | Rogers et al. |
| 5,758,577 A | 6/1998 | Ebina |
| 5,768,521 A | 6/1998 | Dedrick |
| 5,778,367 A | 7/1998 | Wesinger, Jr. et al. |
| 5,778,368 A | 7/1998 | Hogan et al. |
| 5,787,425 A | 7/1998 | Bigus |
| 5,790,789 A | 8/1998 | Suarez |
| 5,790,793 A | 8/1998 | Higley |
| 5,793,964 A | 8/1998 | Rogers et al. |
| 5,793,966 A | 8/1998 | Amstein et al. |
| 5,794,233 A | 8/1998 | Rubinstein |
| 5,796,945 A | 8/1998 | Tarabella |
| 5,799,151 A | 8/1998 | Hoffer |
| 5,805,719 A | 9/1998 | Pare, Jr. et al. |
| 5,812,769 A | 9/1998 | Graber et al. |
| 5,813,007 A | 9/1998 | Nielsen |
| 5,815,665 A | 9/1998 | Teper et al. |
| 5,818,935 A | 10/1998 | Maa |
| 5,819,284 A | 10/1998 | Farber et al. |
| 5,825,884 A | 10/1998 | Zdepski et al. |
| 5,828,839 A | 10/1998 | Moncreiff |
| 5,832,474 A | 11/1998 | Lopresti et al. |
| 5,832,494 A | 11/1998 | Egger et al. |
| 5,835,724 A | 11/1998 | Smith et al. |
| 5,838,910 A | 11/1998 | Domenikos et al. |
| 5,838,916 A | 11/1998 | Domenikos et al. |
| 5,838,918 A | 11/1998 | Prager et al. |
| 5,842,185 A | 11/1998 | Chancey et al. |
| 5,845,073 A | 12/1998 | Carlin et al. |
| 5,848,396 A | 12/1998 | Gerace |
| 5,854,897 A | 12/1998 | Radziewicz et al. |
| 5,855,015 A | 12/1998 | Shoham |
| 5,855,020 A | 12/1998 | Kirsch |
| 5,860,068 A | 1/1999 | Cook |
| 5,860,073 A | 1/1999 | Ferrel et al. |
| 5,862,325 A | 1/1999 | Reed et al. |
| 5,870,546 A | 2/1999 | Kirsch |
| 5,870,552 A | 2/1999 | Dozier et al. |
| 5,875,296 A | 2/1999 | Shi et al. |
| 5,875,437 A | 2/1999 | Atkins |
| 5,878,215 A | 3/1999 | Kling et al. |
| 5,878,219 A | 3/1999 | Vance, Jr. et al. |
| 5,878,408 A | 3/1999 | Van Huben et al. |
| 5,884,033 A | 3/1999 | Duvall et al. |
| 5,884,035 A | 3/1999 | Butman et al. |
| 5,884,045 A | 3/1999 | Kurihara |
| 5,887,133 A | 3/1999 | Brown et al. |
| 5,890,140 A | 3/1999 | Clark et al. |
| 5,890,152 A | 3/1999 | Rapaport et al. |
| 5,892,900 A | 4/1999 | Ginter et al. |
| 5,892,909 A | 4/1999 | Grasso et al. |
| 5,893,075 A | 4/1999 | Plainfield et al. |
| 5,893,091 A | 4/1999 | Hunt et al. |
| 5,893,128 A | 4/1999 | Nauckhoff |
| 5,894,554 A | 4/1999 | Lowery et al. |
| 5,895,468 A | 4/1999 | Whitmyer, Jr. |
| 5,895,838 A | 4/1999 | Harjunmaa et al. |
| 5,897,620 A | 4/1999 | Walker et al. |
| 5,897,622 A | 4/1999 | Blinn et al. |
| 5,898,836 A | 4/1999 | Freivald et al. |
| 5,901,287 A | 5/1999 | Bull et al. |
| 5,903,881 A | 5/1999 | Schrader et al. |
| 5,905,736 A | 5/1999 | Ronen et al. |
| 5,905,865 A | 5/1999 | Palmer et al. |
| 5,907,837 A | 5/1999 | Ferrel et al. |
| 5,907,838 A | 5/1999 | Miyasaka et al. |
| 5,908,469 A | 6/1999 | Botz et al. |
| 5,913,202 A | 6/1999 | Motoyama |
| 5,918,019 A | 6/1999 | Valencia |
| 5,918,214 A | 6/1999 | Perkowski |
| 5,920,848 A | 7/1999 | Schutzer et al. |
| 5,923,736 A | 7/1999 | Shachar |
| 5,924,090 A | 7/1999 | Krellenstein |
| 5,926,798 A | 7/1999 | Carter |
| 5,930,777 A | 7/1999 | Barber |
| 5,931,907 A | 8/1999 | Davies et al. |
| 5,931,947 A | 8/1999 | Burns et al. |
| 5,933,604 A | 8/1999 | Inakoshi |
| 5,933,811 A | 8/1999 | Angles et al. |
| 5,933,816 A | 8/1999 | Zeanah et al. |
| 5,937,168 A | 8/1999 | Anderson et al. |
| 5,937,392 A | 8/1999 | Alberts |
| 5,943,424 A | 8/1999 | Berger et al. |
| 5,948,040 A | 9/1999 | DeLorme et al. |
| 5,949,326 A | 9/1999 | Wicks et al. |
| 5,951,637 A | 9/1999 | Kuzma |
| 5,951,642 A | 9/1999 | Onoe et al. |
| 5,956,709 A | 9/1999 | Xue |
| 5,958,008 A | 9/1999 | Pogrebisky et al. |
| 5,961,593 A | 10/1999 | Gabber et al. |
| 5,961,601 A | 10/1999 | Iyengar |
| 5,963,915 A | 10/1999 | Kirsch |
| 5,963,924 A | 10/1999 | Williams et al. |
| 5,963,925 A | 10/1999 | Kolling et al. |
| 5,963,949 A | 10/1999 | Gupta et al. |
| 5,963,952 A | 10/1999 | Smith |
| 5,963,964 A | 10/1999 | Nielsen |
| 5,963,967 A | 10/1999 | Umen et al. |
| 5,966,441 A | 10/1999 | Calamera |
| 5,966,697 A | 10/1999 | Fergerson et al. |
| 5,974,406 A | 10/1999 | Bisdikian et al. |
| 5,974,430 A | 10/1999 | Mutschler et al. |
| 5,978,766 A | 11/1999 | Luciw |
| 5,978,779 A | 11/1999 | Stein et al. |
| 5,978,780 A | 11/1999 | Watson |
| 5,978,828 A | 11/1999 | Greer et al. |
| 5,978,842 A | 11/1999 | Noble |
| 5,982,891 A | 11/1999 | Ginter et al. |
| 5,983,170 A | 11/1999 | Goodman |
| 5,983,200 A | 11/1999 | Slotznick |
| 5,983,214 A | 11/1999 | Lang et al. |
| 5,983,227 A | 11/1999 | Nazem et al. |
| 5,983,268 A | 11/1999 | Freivald |
| 5,987,440 A | 11/1999 | O'Neil et al. |
| 5,987,454 A | 11/1999 | Hobbs |
| 5,987,466 A | 11/1999 | Greer et al. |
| 5,987,498 A | 11/1999 | Athing et al. |
| 5,987,611 A | 11/1999 | Freund |
| 5,990,887 A | 11/1999 | Redpath et al. |
| 5,991,735 A | 11/1999 | Gerace |
| 5,991,756 A | 11/1999 | Wu |
| 5,995,756 A | 11/1999 | Hermann |
| 5,995,943 A | 11/1999 | Bull et al. |
| 5,995,965 A | 11/1999 | Experton |
| 5,996,010 A | 11/1999 | Leong et al. |
| 5,999,179 A | 12/1999 | Kekic et al. |

| | | | | | | |
|---|---|---|---|---|---|---|
| 5,999,940 | A | 12/1999 | Ranger | 6,169,992 | B1 | 1/2001 | Beall et al. |
| 5,999,975 | A | 12/1999 | Kittaka et al. | 6,172,677 | B1 | 1/2001 | Stautner et al. |
| 6,000,033 | A | 12/1999 | Kelley et al. | 6,175,864 | B1 | 1/2001 | Addison et al. |
| 6,000,832 | A | 12/1999 | Franklin et al. | 6,181,786 | B1 | 1/2001 | Detampel et al. |
| 6,003,077 | A | 12/1999 | Bawden et al. | 6,182,085 | B1 | 1/2001 | Eichstaedt |
| 6,006,227 | A | 12/1999 | Freeman et al. | 6,182,142 | B1 | 1/2001 | Win |
| 6,006,333 | A | 12/1999 | Nielsen | 6,182,229 | B1 | 1/2001 | Nielsen |
| 6,009,408 | A | 12/1999 | Buchanan | 6,185,601 | B1 | 2/2001 | Wolff |
| 6,009,429 | A | 12/1999 | Greer et al. | 6,192,380 | B1 | 2/2001 | Light et al. |
| 6,012,087 | A | 1/2000 | Freivald et al. | 6,192,407 | B1 | 2/2001 | Smith et al. |
| 6,014,429 | A | 1/2000 | LaPorta et al. | 6,195,651 | B1 | 2/2001 | Handel et al. |
| 6,014,502 | A | 1/2000 | Moraes | 6,199,077 | B1 | 3/2001 | Inala et al. |
| 6,018,724 | A | 1/2000 | Arent | 6,199,079 | B1 | 3/2001 | Gupta et al. |
| 6,023,684 | A | 2/2000 | Pearson | 6,199,082 | B1 | 3/2001 | Ferrel et al. |
| 6,023,698 | A | 2/2000 | Lavey | 6,199,099 | B1 | 3/2001 | Gershman et al. |
| 6,029,175 | A | 2/2000 | Chow et al. | 6,199,113 | B1 | 3/2001 | Alegre et al. |
| 6,029,180 | A | 2/2000 | Murata et al. | 6,202,062 | B1 | 3/2001 | Cameron et al. |
| 6,029,182 | A | 2/2000 | Nehab et al. | 6,202,210 | B1 | 3/2001 | Ludtke |
| 6,029,195 | A | 2/2000 | Herz | 6,205,433 | B1 | 3/2001 | Boesch |
| 6,029,207 | A | 2/2000 | Heninger | 6,205,456 | B1 | 3/2001 | Nakao |
| 6,031,354 | A | 2/2000 | Wiley et al. | 6,205,473 | B1 | 3/2001 | Thomasson et al. |
| 6,032,162 | A | 2/2000 | Burke | 6,208,975 | B1 | 3/2001 | Bull |
| 6,038,601 | A | 3/2000 | Lambert et al. | 6,212,548 | B1 | 4/2001 | DeSimone et al. |
| 6,038,603 | A | 3/2000 | Joseph | 6,219,705 | B1 | 4/2001 | Steinberger et al. |
| 6,038,668 | A | 3/2000 | Chipman et al. | 6,223,292 | B1 | 4/2001 | Dean et al. |
| 6,041,307 | A | 3/2000 | Ahuja et al. | 6,226,648 | B1 | 5/2001 | Appleman et al. |
| 6,041,326 | A | 3/2000 | Amro et al. | 6,226,750 | B1 | 5/2001 | Trieger |
| 6,044,372 | A | 3/2000 | Rothfus et al. | 6,233,592 | B1 | 5/2001 | Schnelle et al. |
| 6,044,465 | A | 3/2000 | Dutcher et al. | 6,233,608 | B1 | 5/2001 | Laursen et al. |
| 6,055,236 | A | 4/2000 | Nessett et al. | 6,236,991 | B1 | 5/2001 | Frauenhofer et al. |
| 6,055,570 | A | 4/2000 | Nielsen | 6,236,994 | B1 | 5/2001 | Swartz et al. |
| 6,058,250 | A | 5/2000 | Harwood et al. | 6,237,096 | B1 | 5/2001 | Bisbee et al. |
| 6,058,417 | A | 5/2000 | Hess et al. | 6,240,443 | B1 | 5/2001 | Suzuki et al. |
| 6,061,700 | A | 5/2000 | Brobst et al. | 6,243,755 | B1 | 6/2001 | Takagi et al. |
| 6,061,716 | A | 5/2000 | Moncreiff | 6,252,544 | B1 | 6/2001 | Hoffberg |
| 6,064,985 | A | 5/2000 | Anderson | 6,253,188 | B1 | 6/2001 | Witek et al. |
| 6,065,120 | A | 5/2000 | Laursen et al. | 6,253,208 | B1 | 6/2001 | Wittgreffe et al. |
| 6,070,150 | A | 5/2000 | Remington et al. | 6,253,326 | B1 | 6/2001 | Lincke et al. |
| 6,073,173 | A | 6/2000 | Bittinger et al. | 6,260,039 | B1 | 7/2001 | Schneck et al. |
| 6,078,907 | A | 6/2000 | Lamm | 6,263,501 | B1 | 7/2001 | Schein et al. |
| 6,078,924 | A | 6/2000 | Ainsbury et al. | 6,266,615 | B1 | 7/2001 | Jin |
| 6,078,929 | A | 6/2000 | Rao | 6,266,774 | B1 | 7/2001 | Sampath et al. |
| 6,081,830 | A | 6/2000 | Schindler | 6,271,840 | B1 | 8/2001 | Finseth et al. |
| 6,084,585 | A | 7/2000 | Kraft et al. | 6,278,993 | B1 | 8/2001 | Kumar et al. |
| 6,085,186 | A | 7/2000 | Christianson et al. | 6,279,037 | B1 | 8/2001 | Tams et al. |
| 6,085,188 | A | 7/2000 | Bachmann et al. | 6,282,278 | B1 | 8/2001 | Doganata et al. |
| 6,085,229 | A | 7/2000 | Newman et al. | 6,286,029 | B1 | 9/2001 | Delph |
| 6,085,238 | A | 7/2000 | Yuasa et al. | 6,286,043 | B1 | 9/2001 | Cuomo et al. |
| 6,088,700 | A | 7/2000 | Larsen et al. | 6,289,346 | B1 | 9/2001 | Milewski et al. |
| 6,088,711 | A | 7/2000 | Fein et al. | 6,289,389 | B1 | 9/2001 | Kikinis |
| 6,088,722 | A | 7/2000 | Herz et al. | 6,292,787 | B1 | 9/2001 | Scott et al. |
| 6,101,500 | A | 8/2000 | Lau | 6,301,584 | B1 | 10/2001 | Ranger |
| 6,108,686 | A | 8/2000 | Williams, Jr. | 6,301,621 | B1 | 10/2001 | Haverstock et al. |
| 6,108,691 | A | 8/2000 | Lee et al. | 6,304,860 | B1 | 10/2001 | Martin, Jr. et al. |
| 6,112,212 | A | 8/2000 | Heitler | 6,317,718 | B1 | 11/2001 | Fano |
| 6,119,079 | A | 9/2000 | Wang et al. | 6,317,783 | B1 | 11/2001 | Freishtat |
| 6,119,098 | A | 9/2000 | Guyot et al. | 6,324,538 | B1 | 11/2001 | Wesinger, Jr. et al. |
| 6,119,101 | A | 9/2000 | Peckover | 6,324,569 | B1 | 11/2001 | Ogilvie et al. |
| 6,119,229 | A | 9/2000 | Martinez et al. | 6,330,321 | B2 | 12/2001 | Detampel, Jr. et al. |
| 6,122,673 | A | 9/2000 | Basak et al. | 6,330,561 | B1 | 12/2001 | Cohen et al. |
| 6,125,186 | A | 9/2000 | Saito et al. | 6,330,592 | B1 | 12/2001 | Makuch et al. |
| 6,125,352 | A | 9/2000 | Franklin et al. | 6,334,132 | B1 | 12/2001 | Weeks |
| 6,128,602 | A | 10/2000 | Northington et al. | 6,339,761 | B1 | 1/2002 | Cottingham |
| 6,128,603 | A | 10/2000 | Dent et al. | 6,341,353 | B1 | 1/2002 | Herman et al. |
| 6,128,624 | A | 10/2000 | Papierniak et al. | 6,345,300 | B1 | 2/2002 | Bakshi et al. |
| 6,128,655 | A | 10/2000 | Fields et al. | 6,347,398 | B1 | 2/2002 | Parthasarathy et al. |
| 6,131,115 | A | 10/2000 | Anderson et al. | 6,349,257 | B1 | 2/2002 | Liu et al. |
| 6,134,532 | A | 10/2000 | Lazarus et al. | 6,349,307 | B1 | 2/2002 | Chen |
| 6,134,534 | A | 10/2000 | Walker et al. | 6,351,464 | B1 | 2/2002 | Galvin et al. |
| 6,134,548 | A | 10/2000 | Gottsman et al. | 6,356,834 | B2 | 3/2002 | Hancock et al. |
| 6,134,658 | A | 10/2000 | Multerer et al. | 6,356,899 | B1 | 3/2002 | Chakrabarti et al. |
| 6,138,155 | A | 10/2000 | Davis et al. | 6,356,905 | B1 | 3/2002 | Gershman et al. |
| 6,138,158 | A | 10/2000 | Boyle | 6,360,205 | B1 | 3/2002 | Iyengar |
| 6,141,333 | A | 10/2000 | Chavez, Jr. | 6,360,332 | B1 | 3/2002 | Weinberg et al. |
| 6,141,651 | A | 10/2000 | Riley et al. | 6,366,923 | B1 | 4/2002 | Lenk et al. |
| 6,147,975 | A | 11/2000 | Bowman-Amuah | 6,377,567 | B1 | 4/2002 | Leonard |
| 6,148,402 | A | 11/2000 | Campbell | 6,377,993 | B1 | 4/2002 | Brandt et al. |
| 6,157,924 | A | 12/2000 | Austin | 6,380,890 | B1 | 4/2002 | Smith et al. |
| 6,167,448 | A | 12/2000 | Hemphill et al. | 6,381,592 | B1 | 4/2002 | Reuning |

| | | |
|---|---|---|
| 6,385,595 B1 | 5/2002 | Kolling et al. |
| 6,385,655 B1 | 5/2002 | Smith et al. |
| 6,397,212 B1 | 5/2002 | Biffar |
| 6,405,245 B1 | 6/2002 | Burson et al. |
| 6,408,292 B1 | 6/2002 | Bakalash et al. |
| 6,412,073 B1 | 6/2002 | Rangan |
| 6,421,693 B1 | 7/2002 | Nishiyama et al. |
| 6,424,979 B1 | 7/2002 | Livingston et al. |
| 6,430,542 B1 | 8/2002 | Moran |
| 6,438,580 B1 | 8/2002 | Mears et al. |
| 6,442,590 B1 | 8/2002 | Inala et al. |
| 6,442,607 B1 | 8/2002 | Korn et al. |
| 6,453,339 B1 | 9/2002 | Schultz et al. |
| 6,470,383 B1 | 10/2002 | Leshem et al. |
| 6,473,740 B2 | 10/2002 | Cockrill et al. |
| 6,484,155 B1 | 11/2002 | Kiss |
| 6,490,601 B1 | 12/2002 | Markus et al. |
| 6,499,036 B1 | 12/2002 | Gurevich |
| 6,499,042 B1 | 12/2002 | Markus |
| 6,516,303 B1 | 2/2003 | Wallman |
| 6,517,587 B2 | 2/2003 | Satyavolu et al. |
| 6,538,673 B1 | 3/2003 | Maslov |
| 6,544,295 B1 | 4/2003 | Bodnar |
| 6,546,393 B1 | 4/2003 | Khan |
| 6,553,359 B1 | 4/2003 | Schwenkreis |
| 6,560,639 B1 | 5/2003 | Dan et al. |
| 6,567,814 B1 | 5/2003 | Bankler et al. |
| 6,567,850 B1 | 5/2003 | Freishtat et al. |
| 6,572,662 B2 | 6/2003 | Manohar et al. |
| 6,594,766 B2 | 7/2003 | Rangan et al. |
| 6,601,066 B1 | 7/2003 | Davis-Hall et al. |
| 6,605,120 B1 | 8/2003 | Fields et al. |
| 6,606,606 B2 | 8/2003 | Starr |
| 6,609,128 B1 | 8/2003 | Underwood |
| 6,609,200 B2 | 8/2003 | Anderson |
| 6,625,581 B1 | 9/2003 | Perkowski |
| 6,631,402 B1 | 10/2003 | Devine et al. |
| 6,631,496 B1 | 10/2003 | Li et al. |
| 6,633,910 B1 | 10/2003 | Rajan et al. |
| 6,643,652 B2 | 11/2003 | Helgeson et al. |
| 6,694,546 B1 | 2/2004 | Kasem |
| 6,697,860 B1 | 2/2004 | Kung |
| 6,717,376 B2 | 4/2004 | Lys et al. |
| 6,718,365 B1 | 4/2004 | Dutta |
| 6,725,425 B1 | 4/2004 | Rajan et al. |
| 6,732,102 B1 | 5/2004 | Khandekar |
| 6,745,229 B1 | 6/2004 | Gobin et al. |
| 6,754,833 B1 | 6/2004 | Black et al. |
| 6,792,082 B1 | 9/2004 | Levine |
| 6,792,422 B1 | 9/2004 | Stride et al. |
| 6,801,929 B1 | 10/2004 | Donoho et al. |
| 6,802,042 B2 | 10/2004 | Rangan |
| 6,807,558 B1 | 10/2004 | Hassett et al. |
| 6,810,414 B1 | 10/2004 | Brittain |
| 6,826,553 B1 | 11/2004 | DaCosta et al. |
| 6,847,988 B2 | 1/2005 | Toyouchi et al. |
| 6,856,415 B1 | 2/2005 | Simchik et al. |
| 6,859,212 B2 | 2/2005 | Kumar et al. |
| 6,901,394 B2 | 5/2005 | Chauhan et al. |
| 6,915,336 B1 | 7/2005 | Hankejh et al. |
| 6,915,482 B2 | 7/2005 | Jellum et al. |
| 6,920,609 B1 | 7/2005 | Manber et al. |
| 6,944,660 B2 | 9/2005 | Eshghi et al. |
| 7,006,993 B1 | 2/2006 | Cheong et al. |
| 7,013,310 B2 | 3/2006 | Messing et al. |
| 7,085,994 B2 | 8/2006 | Gvily |
| 7,085,997 B1 | 8/2006 | Wu et al. |
| 7,178,096 B2 | 2/2007 | Rangan et al. |
| 7,225,249 B1 | 5/2007 | Barry et al. |
| 7,249,315 B2 | 7/2007 | Moetteli |
| 7,313,813 B2 | 12/2007 | Rangan et al. |
| 2001/0000537 A1 | 4/2001 | Inala et al. |
| 2001/0011341 A1 | 8/2001 | Hayes, Jr. et al. |
| 2001/0016034 A1 | 8/2001 | Singh et al. |
| 2001/0020237 A1 | 9/2001 | Yarnall et al. |
| 2001/0020242 A1 | 9/2001 | Gupta et al. |
| 2001/0023414 A1 | 9/2001 | Kumar et al. |
| 2001/0032182 A1 | 10/2001 | Kumar et al. |
| 2001/0037294 A1 | 11/2001 | Freishtat et al. |
| 2001/0051907 A1 | 12/2001 | Kumar et al. |
| 2002/0002536 A1 | 1/2002 | Braco |
| 2002/0007330 A1 | 1/2002 | Kumar et al. |
| 2002/0015480 A1 | 2/2002 | Daswani et al. |
| 2002/0019810 A1 | 2/2002 | Kumar et al. |
| 2002/0023104 A1 | 2/2002 | Satyavolu et al. |
| 2002/0023108 A1 | 2/2002 | Daswani et al. |
| 2002/0032782 A1 | 3/2002 | Rangan et al. |
| 2002/0059369 A1 | 5/2002 | Kern et al. |
| 2002/0078079 A1 | 6/2002 | Rangan et al. |
| 2002/0082990 A1 | 6/2002 | Jones |
| 2002/0095651 A1 | 7/2002 | Kumar et al. |
| 2002/0174006 A1 | 11/2002 | Rugge et al. |
| 2003/0120774 A1 | 6/2003 | Satyavolu et al. |
| 2003/0126134 A1 | 7/2003 | Messing et al. |
| 2003/0191661 A1 | 10/2003 | Doyle et al. |
| 2003/0204485 A1 | 10/2003 | Triggs |
| 2004/0031030 A1 | 2/2004 | Kidder et al. |
| 2004/0056889 A1* | 3/2004 | Katano .......... 345/741 |
| 2004/0078282 A1 | 4/2004 | Robinson |
| 2004/0158524 A1 | 8/2004 | Anderson et al. |
| 2004/0162778 A1 | 8/2004 | Kramer et al. |
| 2004/0187029 A1* | 9/2004 | Ting .......... 713/201 |
| 2004/0236696 A1 | 11/2004 | Aoki et al. |
| 2005/0019796 A1 | 1/2005 | Meiring et al. |
| 2005/0033968 A1 | 2/2005 | Dupouy et al. |
| 2005/0034055 A1 | 2/2005 | Rangan et al. |
| 2005/0165651 A1 | 7/2005 | Mohan |
| 2005/0210297 A1 | 9/2005 | Wu et al. |
| 2006/0031683 A1* | 2/2006 | Marion et al. .......... 713/185 |
| 2006/0037067 A1* | 2/2006 | Morris et al. .......... 726/7 |
| 2006/0116949 A1 | 6/2006 | Wehunt et al. |
| 2006/0253463 A1 | 11/2006 | Wu et al. |
| 2006/0253742 A1 | 11/2006 | Elenburg et al. |
| 2006/0282678 A1* | 12/2006 | Ali et al. .......... 713/185 |
| 2008/0271122 A1* | 10/2008 | Nolan et al. .......... 726/4 |
| 2009/0015439 A1* | 1/2009 | Dara et al. .......... 341/23 |
| 2010/0081414 A1* | 4/2010 | Poisner .......... 455/411 |

FOREIGN PATENT DOCUMENTS

| | | |
|---|---|---|
| EP | 0848338 | 6/1998 |
| GB | 2402649 A * | 12/2004 |
| JP | 7074817 | 3/1995 |
| WO | 97/16796 | 5/1997 |
| WO | 97/37314 | 10/1997 |
| WO | 98/28698 | 7/1998 |
| WO | 01/33759 | 5/2001 |

OTHER PUBLICATIONS

Declaration of Jonathan J. Lamberson in Support of Yodlee's Opposition to Cashedge's Motion for Leave to File a First Amended Answer, U.S. District Court, N.D., California, *Yodlee v. Cashedge, Inc.*, Case No. C-05-01550, May 22, 2007.

Yodlee's Opposition to Cashedge's Motion for Leave to File a First Amended Answer, U.S. District Court, N.D., California, *Yodlee v. Cashedge, Inc.*, Case No. C-05-01550, May 22, 2007.

Cashedge's Reply Brief in Support of its Motion for Leave to File First Amended Answer and Counterclaims, U.S. District Court, N.D., California, *Yodlee v. Cashedge, Inc.*, Case No. C-05-01550, May 22, 2007.

Declaration of Richard M. Koehl in Support of Cashedge's Motion for Leave to File First Amended Answer and Counterclaims, U.S. District Court, N.D., California, *Yodlee v. Cashedge, Inc.*, Case No. C05-01550, May 25, 2007.

Yodlee's Motion for Leave to File a Sur-reply to Cashedge's Reply Brief in Support of its Motion for Leave to File First Amended Answer and Counterclaims, U.S. District Court, N.D., California, *Yodlee v. Cashedge, Inc.*, Case No. C-05-01550, May 29, 2007.

Cashedge's Opposition to Yodlee's Motion for Leave to rile a Sur-reply, U.S. District Court, N.D., California, *Yodlee v. Cashedge, Inc.*, Case No. C-05-01550, May 30, 2007.

Declaration of Jonathan J. Lamberson Pursuant to Civil Local Rule 79-5(d) Requesting That Documents Remain Under Seal, U.S. District Court, N.D., California, *Yodlee v. Cashedge, Inc.*, Case No. C-05-01550, May 30, 2007.

First Amended Answer and Counterclaims; Demand for Jury Trial, U.S. District Court, N.D., California, *Yodlee* v. *Cashedge, Inc.*, Case No. C-05-01550, May 31, 2007.
Plaintiff Yodlee, Inc.'s Response to Defendant's First Amended Answer and Counterclaims, U.S. District Court, N.D., California, *Yodlee* v. *Cashedge, Inc.*, Case No. C-05-01550, Jun. 27, 2007.
Defendant Cashedge, Inc.'s Notice of Motion, Motion, and Memorandum in Support of Motion for Summary Judgment of Invalidity of the '077 and '783 Patents, U.S. District Court, N.D., California, *Yodlee* v. *Cashedge, Inc.*, Case No. C-05-01550, Jun. 29, 2007.
Yodlee's Opposition to Cashedge's Motion for Summary Judgment of Invalidity of the '077 and '783 Patents, U.S. District Court, N.D., California, *Yodlee* v. *Cashedge, Inc.*, Case No. C-05-01550, Aug. 28, 2007.
Cashedge's Final Invalidity Contentions, U.S. District Court, N.D., California, *Yodlee* v. *Cashedge, Inc.*, Case No. C-05-01550, Feb. 12, 2007.
Defendant Cashedge's Amended Final Invalidity Contentions [Pat. Local Rules 3-3, 3-6, and 3-7], U.S. District Court, N.D., California, *Yodlee* v. *Cashedge, Inc.*, Case No. C-05-01550, May 25, 2007.
Zhao, Y., "A Single Login Web Service Integrator—Web Entrance," Mar. 15, 2004.
Omidyar, P., "Automatic Notification of Web Site Changes," Aug. 30, 1995.
Boeing Chooses NetMind Enterprise Minder to Help Thousands of Employees Track Web-Based Information, PR Newswire, (p. 6426), Nov. 19, 1998.
Sullivan, E., "Caravelle's InfoWatcher 1.1 Keeps an Eye on the Web," PC Week, (p. 33), Jul. 14, 1997.
Cognisoft Announces IntelliServ, A Revolutionary Intranet Information Management Application; A Powerful Solution That Enables the Right Information to Find the Right User at the Right Time, Business Wire, (p. 8140125), Aug. 14, 1996.
FirstFloor and AirMedia Announce Partnership; FirstFloor Smart Delivery to Utilize AirMedia Wireless Technologies, Business Wire, (p. 7291077), Jul. 29, 1997.
Fujitsu Announces Availability of ByeDesk Link for Alpha-Numeric Pages; Next Step in Empowering Mobile Workforces with "Anyplace, Anytime" Information, Business Wire, (p. 7091066), Jul. 9, 1998.
Fujitsu Announces "WebAgent" Application as Part of ByeDesk Link Wireless Server Software, Business Wire, (p. 09010210), Sep. 1, 1998.
Fujitsu Picks NetMind for Wireless Web Agent Software, Computergram International, Sep. 2, 1998.
Fujitsu's ByeDesk Link Now Available on the PalmPilot, Business Wire, (p. 1455), Sep. 21, 1998.
GC Tech's GlobeID Payment Internet Commerce Software Supports Microsoft Merchant Server, Business Wire, (p. 1211286), Jan. 21, 1997.
Kravitz, D.W., "Highly Scalable on-Line Payments Via Task Decoupling," Financial Cryptography First International Conference, (p. 355-73), 1997.
Rapoza, J., "Minding Web Site Changes," PC Week, V. 15, No. 37 (p. 32), Sep. 14, 1998.
NetMind Accepts $7 Million StrategiC Investment From Three Prominent VC Firms—BancBoston, SOFTBANK and Draper Fisher Jurvetson, PR Newswire, (p. 7632), Nov. 6, 1998.
NetMind Celebrates Five Million Active Users, PR Newswire, (p. 6488), Dec. 18, 1998.
NetMind Updates the World's Largest Free Web Tracking Service, PR Newswire, (p. 5077), Sep. 18, 1998.
Douglis, F. et al., "The AT&T Internet Difference Engine: Tracking and Viewing Changes on the Web," World Wide Web, 1(1), (pp. 27-44), Jan. 1998.
Ajzenszmidt, I.M., "Versatile Intelligent Agents in Commercial Applications," Dec. 13, 1998.
Zhao, Y., "WebEntree: A Web Service Aggregator," IBM Systems Journal, vol. 37, No. 4, 1998.
WebVCR Product Bulletin, 1996.
Knoblock, C. et al., "Building Agents for Internet-based Supply Chain Integration," University of Southern California, Information Sciences Institute and Integrated Media Systems Center, 1999.
Muslea, I. et al., "A Hierarchical Approach to Wrapper Induction," University of Southern California, 1999.
Muslea, I. et al., "Wrapper Induction for Semistructured, Web-Based Information Sources," University of Southern California, Information Sciences Institute, the Integrated Media Systems Center, and Computer Science Department, Sep. 1998.
Ashish, N. et al., "Optimizing Information Agents by Selectively Materializing Data," American Association for Artificial Intelligence (1998).
Knoblock, C. et al., "Modeling Web Sources for Information Integration," American Association for Artificial Intelligence (1997).
Ashish, N. et al., "Intelligent Caching for Information Mediators: A KR Based Approach," University of Southern California, Information Sciences Institute, the Integrated Media Systems Center, and Computer Science Department, 1998.
Ashish, N. et al., "Wrapper Generation for Semi-structured Internet Sources," University of Southern California, Information Sciences Institute and Computer Science Department, Dec. 1997.
Ashish, N. et al., "Semi-automatic Wrapper Generation for Internet Information Sources," University of Southern California, Information Sciences Institute and Computer Science Department, 1997.
Frank, M. et al., "An Intelligent User Interface for Mixed-Initiative Multi-Source Travel Planning," Information Sciences Institute, University of Southern California. Knoblock, C., "Deploying Information Agents on the Web," University of Southern California, Information Sciences Institute and Computer Science Department, 2001.
Knoblock, C. "Deploying Information Agents on the Web," University of Southern California, Information Sciences Institute and Computer Science Department, 2003.
Knoblock, C. et al., "The Ariadne approach to Web-based information integration," University of Southern California, Sep./Oct. 1998.
"On-Line Financial Services Project", 1994.
"Online Financial Services Participant Guide", Telephone Services University, 1996.
Quick Reference Handout for Wells Fargo On-Line, Jan. 23, 1996, (18 Pages).
Orbix Programmer's Guide, IONA Technologies, Apr. 1995, (10 Pages).
Trader Implementation with Orbix & ALLBASE (TC talk, Jun. 1994).
Business Wire Article: Wells Fargo Bank is first to offer customers Internet access to bank account balances, May 18, 1995.
Ronayne, M. et al., "Preserving the Past Designing the Future," The Cushing Group, Inc., Sep. 1995.
"Introduction to Distributed Client/Server Computing With Object Broker," The Cushing Group, Inc., Jul. 1994.
"Using CORBA to Integrate Legacy Systems," Presented by Erik S. Townsend, Object World Boston, Mar. 22, 1995.
The Business Case for Distributed Computing, Presented by Michael L. Ronayne, Object World Boston, May 1996.
"Lessons Learned Deploying Large-Scale Distributed Object Computing Systems," Presented by Michael L. Ronayne, Object World Boston, May 1996.
Birrell, A. et al., "Implementing Remote Procedure Calls," ACM Transactions on Computer Systems, vol. 2, No. 1, (pp. 39-59), Feb. 1984.
Ronayne, M. et al., "Distributed Object Technology at Wells Fargo Bank," The Cushing Group, Inc. (1996).
American Banker Article, "Wells Fargo: Innovations in Customer Management," Nov. 3, 1997.
Edwards, N. et al., "Distributed Objects and the World Wide Web," Abstract; Aug. 24, 1994.
"A Note on Distributed Computing," Sun Microsystems Laboratories, Inc., Nov. 1994.
DeNitto, K., "DCE Means Business," Mar. 20, 1995.
Smith, M., Interview with Bruce MacNaughton Article, Nov. 1996.
Truncale, D., CompuServe Brings NT Online Article, Nov. 1996.
CompuServe Keynote Address Given at Internet@Telecom95, Geneva, Switzerland, Oct. 8, 1995.
Edwards, J. et al., "3-Tier Client/Server at Work," Foreword by Robert Orfali, author of The Essential Client/Server Survival Guide, 1997.
Wells Fargo: A Case Study, The Cushing Group, Inc. (1994-1997).

NetBill: An Internet Commerce System Optimized for Network-Delivered Services, Marvin Sirbu and J.D. Tygar, IEEE Personal Communications, 2:4, Aug. 1995, pp. 34-39.

"Collapsible User Interfaces for Information Retrieval Agents," Martin Frank and Pedro Szekely, Proceedings of the International Conference on Intelligent User Interfaces, Jan. 5-8, 1999, Redondo, CA, pp. 15-22.

"A Softbot-based Interface to the Internet," Oren Etzioni and Daniel Weld, Communicaiton in the ACM, vol. 37, No. 7, Jul. 1994, pp. 72-76.

"Strategic Directions in Database Systems—Breaking Out of the Box," Avi Silberschatz and Stan Zdonik et al., ACM Computing Surveys, vol. 28, No. 4, pp. 764-778, Dec. 1996.

"Database Security and Privacy," Sushil Jajodia, ACM Computing Surveys, vol. 28, Issue 1, pp. 129-131, Mar. 1996.

"Managing Security and Privacy of information," Sushil Jajodia, ACM Computing Surveys, vol. 28, Issue 4, Dec. 1996.

Masao Ito, "producet Review WWW Autopilot Software Naminoriyaro Enterprise", Nikkei Windows NT, No. 19, Nikkei BP, Oct. 1, 1998, pp. 26-28 (JPO CSDB Literature No.:National Technical Journal 1998-01804-002.

Masaya Suzuki, "Naminoriyaro Enterprise Ver. 1.0", ASCII NT, vol. 3, No. 10 ASCII Corporation, Oct. 1, 1998, pp. 118-119 (JPO CSDB Literature No.:National Technical Journal 1998-01100-010).

Naminoriyaro Plays an Active Role in Small Offices, INTER-NET magazine, No. 44, Impress Corporation, Sep. 1, 1998, p. 237 (JPO CSDB Literature No.:National Technical Journal 2000-00181-017).

"Autopilot Software Requires No Waiting Time", ASCII DOS/V Issue vol. 4, No. 10, ASCII Corporation, Oct. 1, 1998, pp. 190-191 (JPO CSDB Literature No.:National Technical Journal 1998-01798-011).

"Introduction to Outdoor Network" DOS/V magazine, vol. 6, No. 10, Soft Bank Corporation, May 15, 1997, 993 144-155 (JPO CSDB Literature No.:National Technical Journal 1998-01206-003.

Tadatoshi Hirono, "Have a Lead on Active Web Pages! No. 9", Internet ASCII, vol. 3, No. 4 ASCII Corporation, Apr. 1, 1998, pp. 390-391 (JPO CSDB Literature No.:National Technical Journal 2000-00394-027).

Kazuya Ishikawa, "What is a "cookie" which you see on WWW browsers?", Internet magazine, No. 39, Impress Corporation, Apr. 1, 1998, 99. 216-217 (JPO CSDB Literature No.:National Technical Journal 2000-00176-008).

Jun Nakajima, "Internet Techniques for Beginners No. 9", Interface, vol. 24, No. 9, CQ Publishing Co., Ltd., Sep. 1, 1998, 99. 72-76 (JPO CSDB Literature No.:National Technical Journal 1998-01164-001).

Chaum, D. Security without identification: transaction systems to make big brother obsolete. Communication of the ACM. Oct. 1985. vol. 28. Issue 10 pp. 1030-1044.

Chakrabarti et al. Mining the Web's link structure Computer Aug. 1999. pp. 60-67.

Das et al., Experiments in using agent-based retrieval from distributed heterogeneous database, Knowledge and Data Engineering Exchange Works Nov. 1997 abstract.

Frecon WEBPATH—a three dimensional Web history, Information Visualization IEEE Symposium on Oct. 1998, pp. 3-10.

Park, Intelligent query and browsing information retrieval (QBIR) agent, Acoustics, Speech and Signal Processing, IEEE International Conference May 1998 pp. 1173-1176.

O'Leary, Mick, "NewsWorks, brings new depth to Web news; the site excels with unique sources and value -added editorial features", Information Today v 14 p. 10, 1997.

Stanley, Tracey, "Intelligent Searching Agents on the Web", Jan. 1997, 4 pages, <http://www.ariadne.ac.uk/issue7/search -engines/>.

Jansen, James, "Using an Intelligent Agent to Enhance Search Engine Performance", Dec. 1998, 13 pages, • <http: /www.firstmonday.dk/issues issue2 3/iansen/>.

Lesser, Victor et al., "BIG: A Resource_Bounded Information Gathering Agent", Jan. 1998, 18 pages <http://dis.cs.umass.edu/research/big/>.

Severance C. Could LDAP be the next killer DAP? IEEE Computer vol. 30 Issue 8 Aug. 1997, pp. 88-89.

Gardner Stephen R. Building the data warehouse Communications of the ACM vol. 41 Issue 9 Sep. 1998, pp. 52-60.

Bontempo, Charles et al., The IBM data warehouse, Communications of the ACM, vol. 41, Issue 9, Sep. 1998, pp. 38-48.

Fryer et al. (Eds.), Microsoft Computer Dictionary, 1997 3rd Edition, pp. 238-240, 487.

Mollohan, Gary, Wireless Revolution, Appliance. Aug. 1999. vol. 56. No. 8 p. 49.

Anonymous. Dialog file 20 (World Reporter). No. 3629961. 3Com Announces the Pal, VII Connected Organizer, the First Handheld Solution for Out-Of-The-Box Wireless Internet Access. Business Wire. Dec. 2, 1998. 4 pages, especially p. 1, lines 18-33, p. 2, lines 1-10 p. 3, lines 21-30 and page 4 lines 2-17 and lines 21-24.

Pelline, *LookSmart to be ISP home page*, Web page, unverified print date of Sep. 22, 2000, unverified cover date of Aug. 14, 1997.

Macavinta, *Excite, Lycos get more personal*, Web page, unverified print date of Sep. 22, 2000, unverified cover date of Apr. 13, 1998.

Shiro Iba, "What is it? Explorer File No. 7 'How much is the ease of use of Internet banking?'", SOHO Computing, vol. 3, No. 9, Cybiz Co., Ltd, Jun. 1, 1998, 99 55-60 (JPO CSDB Literature No.:National Technical Journal 1998-00782-002).

Unknown, Roboword, Multilingual Dictionary Tool, Jul. 27, 1997, pp. 1-3, all.

Maret et al., Multimedia Information Intechange: Web Forms Meet Date Servers, Jun. 11, 1999, IEEE International Conference, vol. 2, 499-505.

Armstrong, Robert et al., WebWatcher: A Learning Apprentice for the World Wide Web, School of Computer Science, Carnegie Mellon Univerity, Feb. 1995, pp. 1-7.

Hilbert et al., "Agents for Collecting Application Usage Data Over the Internet," ACM, 1998, pp. 149-156.

Lin et al., "Taking the Byte Out of Cookies," Computer and Society, Jun. 1998, pp. 39-51.

F. Kilander, "A Brief Comparison of News Filtering Software", Department of Computer and Systems Sciences, 1995, pp. 1-13.

K. Sycara et al., "Distributed Intelligent Agents", The Robotics Institue, Carnegie Mellon University, 1996, pp. 1-32.

W3C's, "HTML 4.0 Specification," Apr. 24, 1998, http://www.w3.org/TR/1998/REC-html40-19980424/, pp. 1-27.

* cited by examiner

SYSTEM AND METHODS FOR AUTOMATICALLY ACCESSING A WEB SITE ON BEHALF OF A CLIENT

CROSS-REFERENCE TO RELATED APPLICATIONS

NA

BACKGROUND OF THE INVENTION

1. Field of the Invention

The present invention is in the field of electronic services, including Internet-based services, and pertains particularly to a method and system for automatically accessing a password-protected Web site on behalf of a client.

2. Discussion of the State of the Art

In the field of network-based electronic services there are services that aggregate Web-based data for clients and that provide dash-board style summary presentations of the most current information aggregated on behalf of the client. The inventors are aware of an automated browser-driven system that is able to log on to a password-protected Web site using authentication data provided by the client, to affect a successful login on behalf of the client.

The system utilizes a software agent which is activated to perform the login task for the client. In this way the system may access and aggregate data from a plurality of Web pages to which the client subscribes and has authorization to access. The system works by emulation of the client, and once logged in and representing a client, the system can perform certain pre-defined tasks on behalf of the client. The service provides protected access to summary and transactional information aggregated for a client, and in this way the client need only remember one username/password pair to access their information from all of their subscribed sites through a single interface and provide a full Personal Finance Management Solution.

More recently more sophisticated authentication procedures have been developed that attempt to thwart automatic machine-initiated methods for accessing Web sites that provide protected information. "Completely Automated Public Turing test to tell Computers and Humans Apart" (CAPTCHA) is a login validation procedure that attempts to determine if a human or a machine (software agent) is making the login attempt.

CAPTCHA is a series of distorted characters presented in an image with perhaps other distractive graphics. In order to login successfully, a user must decipher the characters in the image, type them into a data entry field and submit the result to the server for verification before login can be completed. The concept behind CAPTCHA is that a software agent or "bot" cannot "see" the distorted characters and can not then enter them into a data field.

Another recent development that attempts to prevent automated login by a software agent involves a virtual interactive keypad presented as an image wherein the characters presented are sufficient for a user to use the keypad to enter his/her password. The user navigates the presentation by locating the correct characters of his or her password in the keypad and clicking on their locations in the correct order of the characters as they exist in the password, just as one would use a mechanical keypad input.

With the development of these regimens, legitimate services that provide data aggregation for subscribing clients, including bill pay and financial management services, where automated login is periodically required by a software agent, are finding that they can no longer login to some of the client Web sites to retrieve data or perform tasks for the client.

In a data aggregation system known to the inventor, if a CAPTCHA interface is presented for validating that a user is human, then the system may capture the interface and send it to the client whose credentials are to be used to log in to the site, and the client provides the correct character input, which is used to login to the site in the data aggregation sessions made by the software agent. With respect to a keypad touch interface containing standardized characters, the characters required for login may be randomly located anywhere on the keypad, and the characters are typically not in a standard font, but may be distorted, and additional intelligence is then required to affect a successful login.

Therefore, what is clearly needed is a system and methods for automatically deciphering a virtual keypad presentation of characters so that automated login to protected client Web sites can still be achieved by legitimate proxy services in a fully automated manner.

SUMMARY OF THE INVENTION

The problem stated above is that automated services for data aggregation and summary presentation of Web-based information for subscribing clients is a desirable service, but conventional means for performing automated logins for clients to obtain current Web information are not adequate in cases where bot-limiting technology, such as a virtual keypad interactive image, is used in the authentication procedures.

The inventor therefore searched functional elements used in data aggregation and automated login procedures looking for elements that could be harnessed to enhance the intelligence of an auto-login procedure so that more complex login routines can be performed but without compromising site security.

The inventor realized in an inventive moment that if a method for automatically navigating a virtual interactive keypad image could be carried out during a login procedure, more sites using bot-limiting technology could be registered with such a service, enabling the client to retrieve information from a single interface much more efficiently and thoroughly with respect to the aggregate of client-subscribed Web sites included in the service.

The inventor therefore conceived a system for deciphering interactive virtual keypads used to prevent password hacking by capturing keystrokes on the keypad. This innovative system enables login and access to information by proxy without compromising client or Web site security.

Accordingly, in one embodiment of the present invention, a system for performing an automated network-based login procedure on an interactive keypad image is provided. The system includes a software agent executable from a digital medium connected to the network for navigating to a login page, accessing the keypad image, and performing an automated login, and an automated login support application executable from the same or a different digital medium connected to the network, the support application including at least an image processor, an optical character recognizer, and an image data encoder and decoder. The software agent performs a login at the virtual keypad image based on character image matching and location information acquisition for each character of a client's specific set of credential characters included in the image of the keypad.

In one embodiment the network is the Internet network and the keypad image includes the credential characters of a client and other random characters. In one embodiment image data processed by the image processor is encoded to 64 base string. In a preferred embodiment the keypad image is mathematically sectioned to isolate individual characters in the image resulting in multiple character images. In a variation of this embodiment the keypad image is converted into a grayscale image before mathematical sectioning of the image to isolate the characters. The location information corresponds to character position in the virtual keypad image.

In one embodiment characters in the keypad image are identified by character name and the location of the character in the keypad image. In one embodiment the image data decoder returns image data in 64 base string in extensible markup language (XML) format.

In a preferred embodiment of the invention a specific set of credential characters representing a pass code or password are extracted from a navigation template to match them with characters processed from the keypad image to obtain the identification and location of those characters in the keypad image.

In another aspect of the invention a method for processing a keypad image on a login page for an automated login procedure is provided and includes the steps (a) accessing the login page and keypad image on the login page, (b) converting the keypad image to 64 base string data for storage and access (c) mining the encoded image data and converting to a grayscale, and (d) through mathematical process, sectioning the keypad image to isolate individual characters of the image In one aspect of the method in step (a) the keypad image includes the credential characters of a client and other random characters. In one aspect in step (d) mathematical sectioning results in multiple character images and some images void of characters. In a preferred aspect of the method in step (d) the individual characters occupying the keypad image are located by row and column coordinates.

In another aspect of the invention a method is provided for identifying individual characters and their locations in an image. The method includes the steps (a) converting the image into a grayscale image, (b) sectioning the image into individual smaller images of equal size based on configurable parameters each one potentially containing a character, (c) using a character library and/or optical recognition, identifying the characters present in the smaller images, and (d) from the mathematics of the sectioning operation in step (b) applying the original character location information from the larger image to each character identified.

In one aspect of the method in step (b) image sectioning is performed manually. In one aspect in step (d) the location information is expressed in row and column coordinates.

In another aspect of the present invention a method is provided for identifying a specific set of character images included in a pool of character images to obtain recorded location information for each character image identified in the pool that matches a character image in the specific set of character images. The method includes the steps (a) extracting one character image from the credential set and comparing it to all of the character images in the pool for a match, (b) upon character image match, recording the location information associated with the matching character image, and (c) repeating steps (a) and (b) for each character image in the specific set of character images.

In one aspect of this method in step (a) the character images in the specific set of character images and the character images in the pool of character images are encoded in base 64 strings. In a preferred aspect in step (b) the location information is expressed as a row coordinate followed by a column coordinate. In one aspect in step (a) the pool of character images and location coordinates for each image in the pool is embedded in an XML based message reply.

BRIEF DESCRIPTION OF THE DRAWING FIGURES

DETAILED DESCRIPTION

The inventors provide a system and methods for automatically performing a login procedure that includes an interactive keypad image on a Web site. The system and methods of the present invention are enabled in the below description of the several drawings, which may represent more than one embodiment of the invention.

Figure 1:
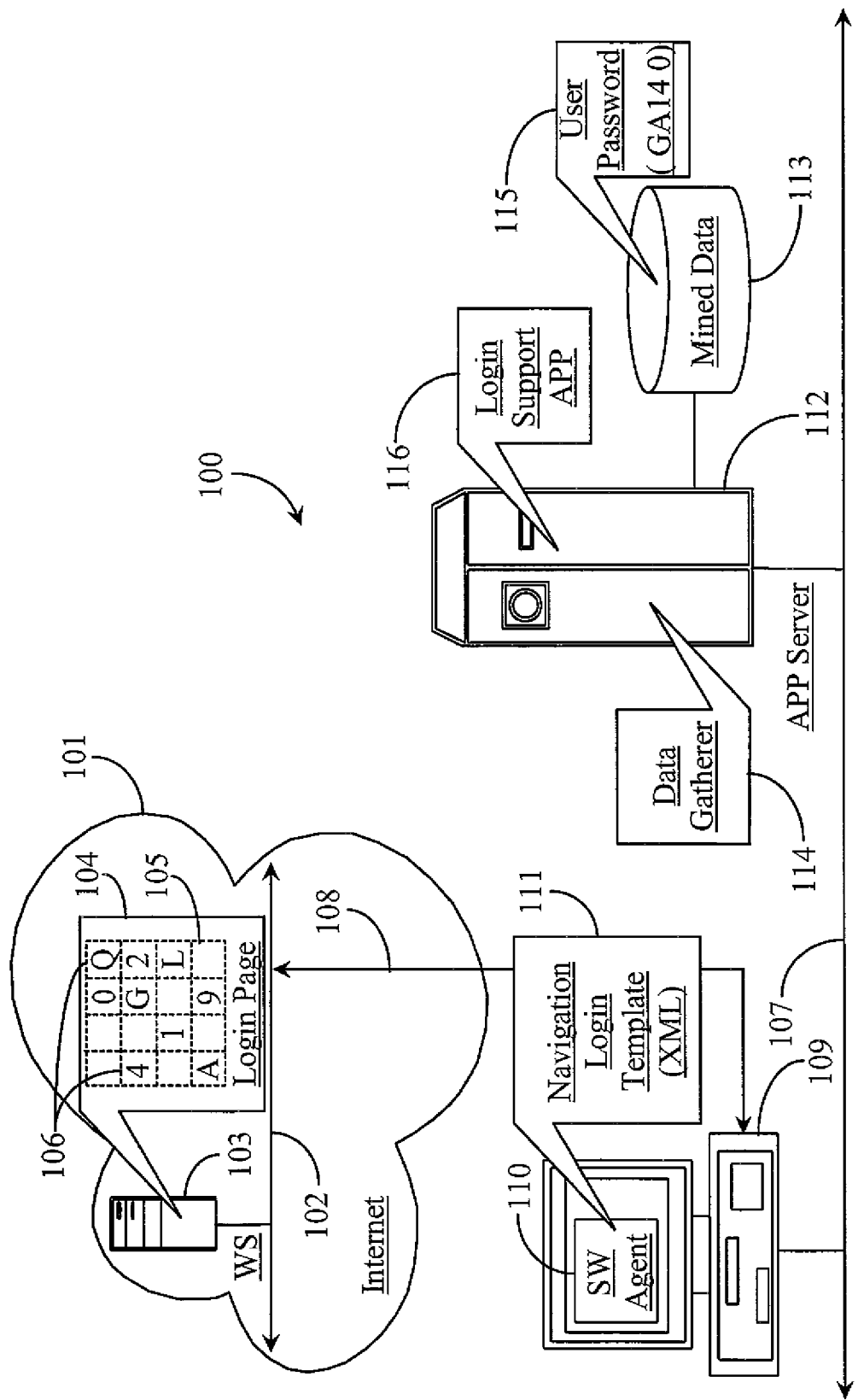
FIG. 1 is an architectural overview of an auto-login system in an embodiment of the present invention.

FIG. 1 is an architectural overview 100 of an auto-login system in an embodiment of the present invention. Overview 100 is a logical representation of a system for performing automated login and data gathering for subscribing clients, and includes in this example a local area network (LAN) 107, which may be a corporate intranet or some other local network having connection to the Internet network illustrated herein as Internet 101.

Internet 101 is further represented herein by network backbone 102, which logically represents all of the lines, equipment, and access points that make up the Internet network as a whole. Therefore, there are no geographic limitations to the practice of the present invention. LAN 107 in this example is adapted for Transfer Control Protocol over Internet Protocol (TCP/IP) and other relevant Internet network protocols for accessing Web services.

A Web server (WS) 103 is illustrated within Internet 101 and has connection to backbone 102. WS 103 has a digital medium accessible thereto for storing Web pages and associated data. WS 103 is an electronic information server adapted to serve Hypertext Transfer Markup (HTM) or similar information pages termed Web pages in the art. Web sites accessible through WS 103 and like servers in the Internet may contain one or more Web pages including one or more customer login pages or interfaces that have to be navigated correctly in order to access password-protected subscriber information.

LAN 107 supports a system for gathering Web hosted data from multiple Web sites for subscribing clients. Any or all of such sites may include login pages that are automatically navigated by the system based on provision of user credentials that are required for login purposes. A login page portion 104 is illustrated in this example and includes a virtual keypad image 105 that is adapted to present randomly located characters 106 arranged on the keypad.

Keypad image 105 is enabled as a virtual touch pad, meaning that for login success the correct characters 106 representing the users credentials must be identified and manipulated in the correct sequence to enable a successful login to the Web site. In a live user-initiated login sequence, a user would locate each character belonging to the user's credentials in the keypad and mouse click the characters in proper order to input the characters for login purposes. In some instances a stylus might be used to manipulate the characters in virtual keypad 105 instead of a mouse.

LAN 107 supports an application (APP) server 112 that hosts a data gatherer 114 and a login support application 116. APP server 112 includes a digital medium represented herein as a data repository 113 connected to the server. Repository 113 is adapted to store updated versions of mined data mined on behalf of Web site subscribers accessing their data through a single interface (not illustrated) provided by the host of the service. The single interface mentioned above is a portal in one embodiment, wherein users may access their data from multiple sites using a single password authenticating them for access to the data summary service.

LAN 107 supports an automated navigation system 109 adapted to access Web sites by proxy for subscribing customers. Navigation system 109 is illustrated in the form of a LAN-connected computer in this embodiment for illustrative purposes only. A software (SW) agent 110 is illustrated on computing device 109 and is adapted to perform automated login sequences for clients in order to gain access to client information and data. Agent 110 is a logic program that is browser-based or otherwise browser-enabled to navigate to a Web universal resource locator (URL), and to log in by proxy to gather information for summary presentation to clients.

SW agent 110 is browser-based or nested and relies on a navigation template 111 for instruction for accessing information from a Web page and for logging into any Web pages requiring user credentials to access. Navigation template 111 is XML-based in a preferred embodiment. A navigation template may be personalized to a particular client site and contains the URLs to all of the client sites including any login pages that must be navigated in order to retrieve some password protected data.

In this example SW agent 110, using navigation/login template 111, is hosted on and executable from a computing node similar to a high end computer located in the Secure Data center. However, this is not required to practice the invention. SW 110 and navigation template 111 may be hosted on and executed from APP server 112 without departing from the spirit and scope of the present invention. The inventor illustrates more than one supporting node for the purpose of clearly separating different SW functionalities. Computer 109 has access over LAN 107 to APP server 112.

Computer 109 has access through path 108 to Internet backbone 102. Many Internet access systems and methods are available and can be used to practice the invention. Access to server 103 on backbone 102 may be made using Cable/Modem, Digital Services Line (DSL), Internet Services Digital Network (ISDN), Dialup modem, or Broadband access services, for example. Computer 109 has LAN communication access to APP server 112, which may function in a role of navigation support in this example.

In a typical data aggregation and summary service mined data is stored for access in data repository 113, which includes any user password and/or other character-based credentials. Navigation template 111 is typically assembled for a client and kept updated for the client. The client may provide credentials and other required information to the service to help enable automated navigation to those sites for the client. Once a complete navigation template is available, SW agent 110 may periodically access Web sites on behalf of the client associated with the template. The automated access includes logging into sites and retrieving data updates from those sites for summarization and client presentation. Data gatherer 114 is a program that works with the SW agent to retrieve specific data from client pages.

Login support application 116 works with the data gatherer and the SW agent to provide updated instructions for template-based navigation and login, including provision of the identification of the characters used in keypad 105 and the exact location of those characters in terms of physical location in the image. A user credential or password 115 in this example is illustrated as data stored in repository 115. Password 115 reads GA140 (reading from left to right). When SW agent 110 is called to navigate and log in to a client login page, the navigation template will include the required login credentials for each login interface, such as user password 115. The number of credential sets in a template for navigating to and logging into the client sites depends in part on the number of sites the client has registered with the data mining service. It is clear that a navigation template may include just one login credential or a larger number of login credentials.

Virtual keypad characters 106 include the characters for the password GA140 and other randomly-selected characters arranged in no particular order on the keypad image. Some of the "cell" locations on the keypad image are blank, containing no characters at all, but in some cases all the cells may have characters. In this case the image has 4 columns and 4 rows thus presenting 16 cells that may contain a single character. Without enhancement according to an embodiment of the present invention, SW agent 110 will be unable to determine how to manipulate the keypad image.

In a preferred embodiment the keypad image 105 of login page 104 is accessed by SW agent 110 invoked by the gatherer over Internet access line 108 and scraped from the site for the purpose of processing the image. SW agent 110 calls Login Support App 116 into service for processing the image and slicing the image into individual cells each ostensibly containing a single character. In this case, gatherer 114 is also enhanced to support the image processing and encoding capabilities and can be used by the agent to decompose the keypad image. The entire image is encoded in one embodiment into a base-64 string and includes location information for each mathematically decomposed cell in the image. For example, character Q is located in the first row and fourth column (1, 4). Each character may be identified by optical character recognition (OCR) and is encoded as a separate template image. The OCR processing might utilize a variety of character libraries to recognize characters. The library may be substantial because the creators of the virtual images use distorted characters in many cases to additionally thwart bots.

The image data encoded in the base-64 string is stored for later comparison by login support application 116. A source document is developed on analyzing the website that includes all of the possible characters used in keypad population for client login. It is noted herein that the exact location of, identification of and number characters included in keypad image 105 may be changed each time the login page is accessed. However, all of the user credentials required to login successfully are included in the image. The fluent nature of character placement may require that the keypad image is scraped from the login page each time the service is navigating the page for the client.

In one embodiment login support application 116 includes tools for reconstruction of the keypad image from a base 64 string into a JAVA image object. In this way, login support application 116 may process the image independently from the gatherer, such that the encoded results may be used to compare with previously encoded results from the keypad image. Login support application 116 returns the identification of each character present in the image and the location of that character in the image with respect to the symmetrical grid defining the keypad to SW agent 110.

After agent 110 has the character identification and location information, the agent extracts the client credentials from the navigation template and matches those characters to the information returned to the agent by login support APP 116. The agent matches the first character and location of the character in the keypad and activates the cell that the character resides in on the image to initiate submission of that character for login purposes. Each subsequent character of the client credentials is treated in the same fashion until the correct password is entered through the virtual keypad.

Figure 2:
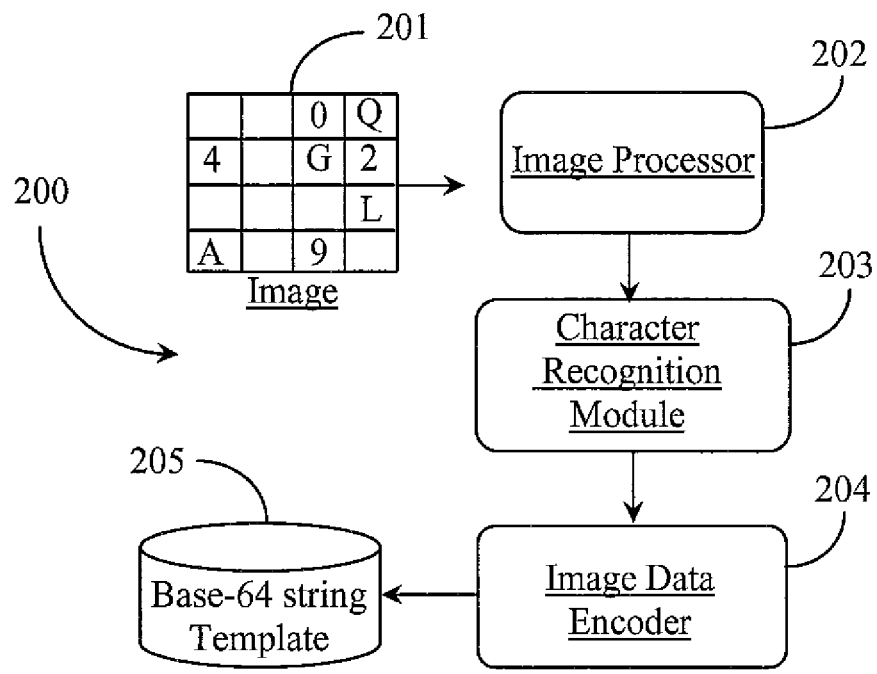
FIG. 2 is a block diagram illustrating components for keypad image processing according to an embodiment of the present invention.

FIG. 2 is a block diagram illustrating components 200 for keypad image processing according to an embodiment of the present invention. A keypad image 201 is illustrated in this example and is analogous to image 105 of FIG. 1. In this example image 201 is taken from a Web site login page and is processed by an image processor 202. Image processor 202 is adapted to convert image 201 to a grayscale image if required to clarify the characters in the image more clearly and also to reduce the weight of the image. In this example the user credentials in the keypad image are (GA140) as described above with respect to image 105 of FIG. 1. Keypad image 201 has 4 rows and 4 columns dividing the keypad into 16 possible interactive cells each potentially containing one character.

In actual practice, individual cells in a keypad image may not be mathematically or clearly geometrically defined, so the image recognition module is further adapted to mathematically decompose image 201 to isolate each character in the image, regardless of distortion of the matrix of the virtual keypad. Image processor 202 produces, in this example, 16 grayscale images by slicing image 201 into equal parts or cells according to symmetry of the characters within the image, such that the division isolates each character, thereby creating an image of each character that can be treated separately from the whole image. Image processor 202 in this case, the location relative to the whole image for each part mathematically isolated from the image. Location of a character depends on where the cell containing the character fits in the overall keypad image. For example, the character Q is in the first row and fourth column (1, 4) of the whole keypad image 201. In one embodiment all of the mathematically isolated images contain a complete character. In another embodiment there may be sectioned images that do not contain any characters.

After the individual characters are isolated, an optical character recognition module 203 may be used to identify each character. Again, the OCR system has access to an extensive library that may, in some cases, include images of characters scraped from a variety of web pages. The image is first encoded into the base 64 string so as to transfer the image between components. The image processing occurs at some point in time before the service will attempt a login using the keypad on behalf of a client. The template is logically illustrated herein as a repository 205. During the processing of an image, a library of characters may be accessed from source code or a character library may be obtained or built for use in character recognition.

Figure 3:
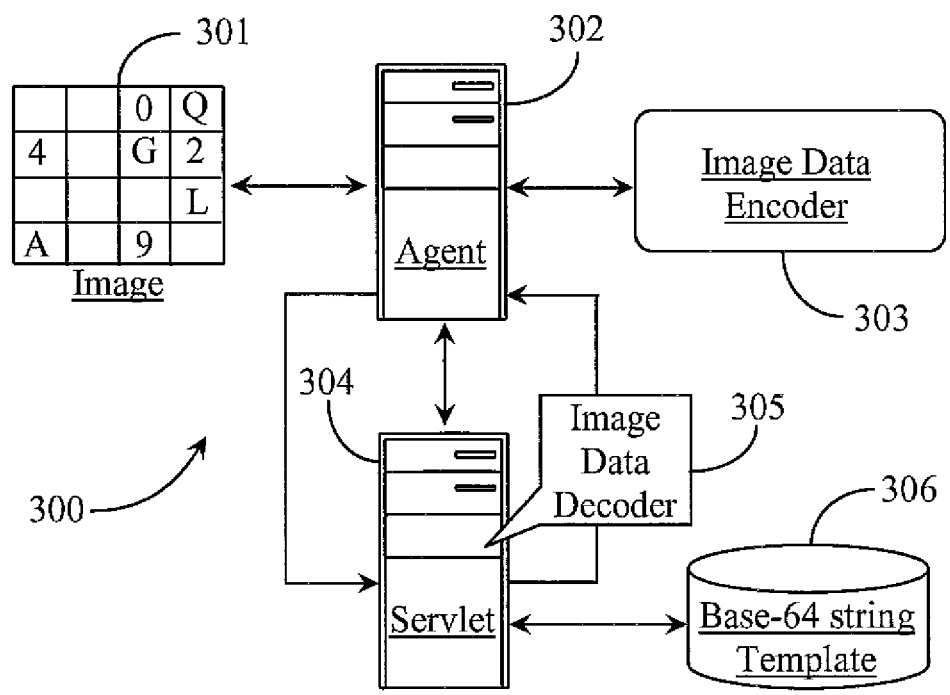
FIG. 3 is block diagram illustrating components for logging into a Web site containing a keypad image according to an embodiment of the present invention.

FIG. 3 is block diagram illustrating components 300 for logging into a Web site containing a keypad image according to an embodiment of the present invention. Components 300 include a keypad image 301. Keypad image 301 is analogous to the previously defined key pad images of FIG. 1 and of FIG. 2. In this case a software agent 302, illustrated in this example as a computing server, that has access to image 301. An agent 302 accesses image 301 during normal data gathering for a client and calls a process for encoding the keypad image.

An image data encoder 303 may be used to encode the image into base 64 in a preferred embodiment. The image in this case may be encoded without grayscale converting. In one embodiment all of the image processing, mathematical sectioning and image data encoding may be achieved by a same application, perhaps running on a support node such as a server accessible to the software agent. In another embodiment all processing is done on one powerful machine. In this case the agent is engaged in actual servicing of the client and will attempt a login at the site by manipulating the keypad image.

Agent 302 generates a request and sends the request to a server 304 analogous to server 112 of FIG. 1. A directional arrow from agent 302 to servelet 304 illustrates the request communication. Server 304 may host a JAVA embodiment and a JAVA servelet may be the communicating component that actually interfaces with the SW agent. The request in one embodiment contains the whole keypad image 301 just taken from the login page encoded in base 64, and the individual character images are encoded in base 64 and stored in the template from earlier processing.

At server 304 in this example an image data decoder 305 is used to reconstruct the whole encoded image from the login page that was included in the request from base 64 to a JAVA image object in a JAVA runtime environment. The steps for converting the image to grayscale and slicing the image into equal parts to isolate the individual characters are repeated by the JAVA machine. Image data decoder 305 may be part of the login support application described further above in FIG. 1. The decoder uses an algorithm to compare each character cell created from the latest image with the character cells sent from the template (template can be sent as a part of the request as well as can be pre deployed with the application), illustrated in this example as repository 306. Decoder 305 identifies each character from the latest image and reports its location in the keypad image in a reply to SW agent 302. The reply is in XML format in a preferred embodiment. For each character included in the reply, a location of the character in the keypad image is also reported.

The SW agent uses the reply message as a set of instructions for navigating keypad image 301. For example, the user credential characters and the operating sequence of the credential is known to the agent and preserved in the navigation template. SW agent 302 extracts each character from the template and matches it to a corresponding character (this can be configured for 100% or 99.8% etc. match success etc.) in the XML response and thereby also identifies the location of that character in the current keypad image on the login page. SW agent 302 then may successfully enter the correct characters on the keypad in the correct order to achieve a successful login for the client.

A reason for pre-mining the virtual keypad image and then subsequently taking the keypad image from the login page during a login attempt is that the image characters may be shuffled in the image between logins by the same client. In this respect the credentials in the image may have different locations in the image at a next login. In one embodiment, the character identifications and character location parameters in the image are considered good by the SW agent at each login performed on behalf of a client until such time that the login cannot be successfully achieved using the existing data. At this point the SW agent may reprocess the image. In another embodiment the virtual keypad image located by the SW agent is processed each time the Web site is accessed on behalf of the client.

In one embodiment of the present invention, the virtual keypad image on a login page has characters that are not necessarily symmetrically aligned to enable symmetric mathematical sectioning of the image to isolate the characters. In this case the characters are standard, do not overlap or run into one another, but are not symmetrically aligned. In such a case the image processor may isolate each character in the image by boundary and may select a pixel location for a standard resolution as the center location for the character. In one embodiment interactive hyperlinks are embedded in each character location in the image and the character locations are deduced from detecting the embedded links in the source code of the image and mapping their locations with respect to the image border regions.

Figure 4:
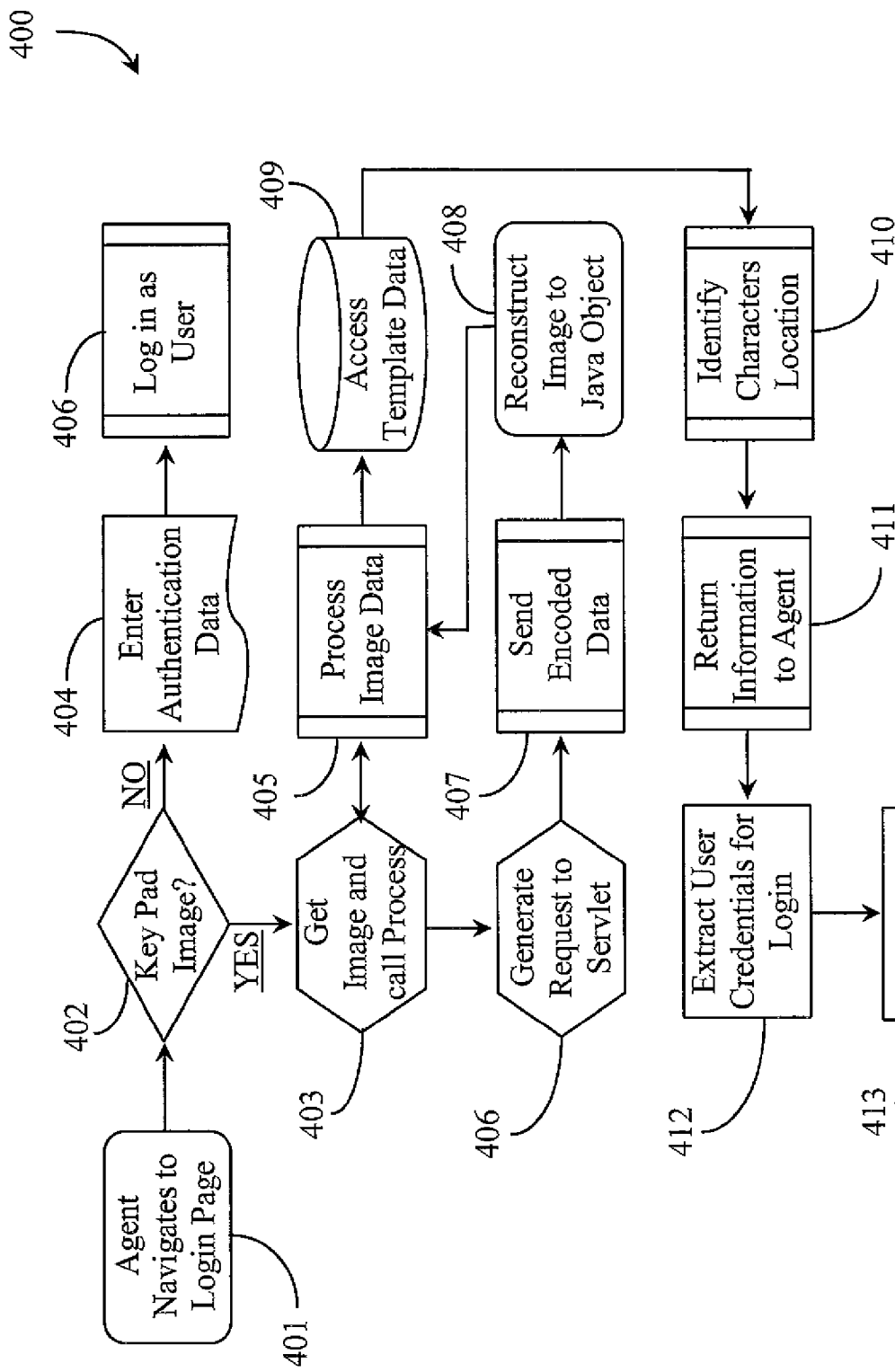
FIG. 4 is a process flow chart illustrating steps for logging into a Web site presenting a virtual touch activated keypad according to an embodiment of the present invention.

FIG. 4 is a process flow chart illustrating steps 400 for logging into a Web site presenting a virtual touch-activated keypad according to an embodiment of the present invention. At step 401 a SW agent analogous to agent 110 of FIG. 1 navigates to a login page on behalf of a subscribing client. At step 402, the system determines if there is a virtual keypad image that is part of the login procedure. If at step 402 there is no keypad image, then at step 404 the agent may enter the user credentials in the provided field or fields according to normal auto login capabilities. At step 406 the SW agent logs into the site as the authenticated user of the site.

At step 402, if the system detects a keypad image, then at step 403 the SW agent gets the image via download or screen scraping or clipping and calls a process to encode the image. In this case it is assumed that the virtual keypad image has been previously mined and processed for template data. At step 405 the image is processed and encoded in 64 base string and the encoded data is returned to the SW agent. At step 406 the agent generates an XML-formatted request to a JAVA-based servelet that may be part of a JAVA-based image decoding process. At step 407 the encoded keypad image and the previously mined and encoded character images from the navigation template are sent to the JAVA servelet.

At step 408 the encoded image of the virtual keypad is reconstructed as a JAVA image object. The process loops back to step 405 where the reconstructed image is processed by converting the image to grayscale, slicing the image to isolate the individual characters of the image and mapping the locations for each character in the image. It is noted herein that mathematic decomposition of the keypad image may be performed based of configurable parameters according to the symmetric pattern of character placement in the image. The entire image is sectioned into equal parts where each part potentially encloses a single character following the rules of a keypad.

In the second processing step (405) the servlet receives base 64 string representing the last keypad image taken at step 403 and each of the character images from the navigation template that were previously identified. The character images from the most recent keypad image do not require encoding. The process then moves to step 409 and the servlet accesses the template-based character image data received in the request of step 406 for use in identifying the JAVA character images. At step 410 the image decoder matches the characters to those of the template and validates the location information in the keypad image for the isolated character images.

At step 411 the JAVA servelet returns the character identification and location information for all of the identified characters to the SW agent in an XML response to the request of step 403. At step 412 the SW agent extracts the client's credential characters for performing a login attempt. At step 413 the SW agent performs the login by identifying each character and the correct location parameters and performs the equivalent of the mouse clicks on the virtual keypad image at the correct location and sequence to complete the login procedure. In this process there is a secondary validation of location for the characters, because character location may be changed between logins on behalf of the same client.

In this exemplary process character recognition is performed by an OCR technique using a known character library. In one embodiment image data may be encoded in some other format instead of 64 base string without departing from the spirit and scope of the invention. The inventor utilizes a 64 base string encoding scheme for convenience and reliability.

Figure 5:
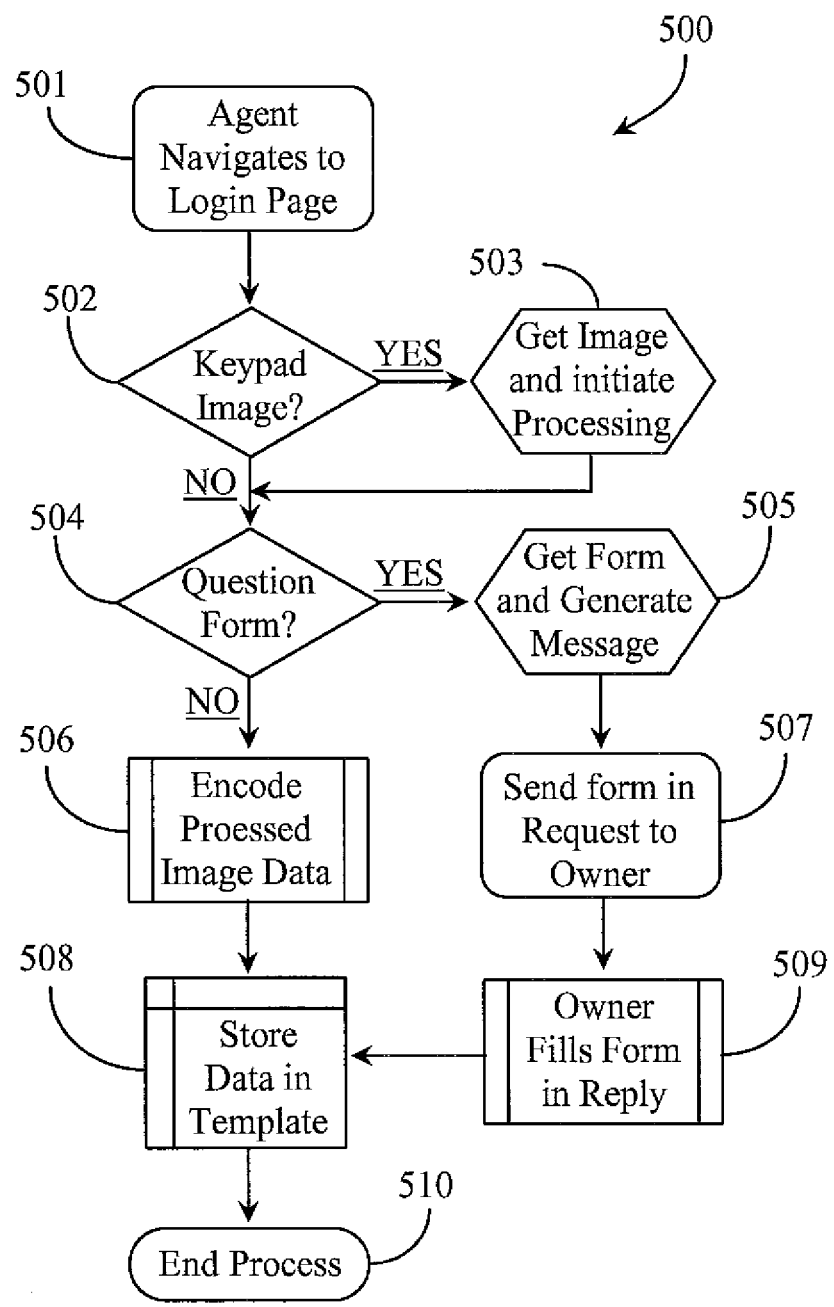
FIG. 5 is a process flow chart illustrating steps for dealing with security question and answer requirements during premining of a virtual keypad image for developing a login procedure.

FIG. 5 is a process flow chart illustrating steps 500 for dealing with security question and answer requirements during pre-mining of a virtual keypad image for developing a login procedure. At step 501 a SW agent analogous to agent 110 of FIG. 1 navigates to a login page on behalf of a client. At step 502 the system determines if there is a virtual keypad image on the login page that is involved with the login procedure at the site. If there is a keypad image at the login page the agent gets the image and initiates image processing at step 503. The process then loops back to the main process branch.

If at step 502 there is no keypad image, the agent may determine if there is a question and answer requirement that must be performed to successfully login to the site. If at step 504 the agent determines there is a question and answer form that is required to be filled in to login, the agent gets the form and questions and generates a message to the authenticated user of the site at step 505 as part of a data mining process. At step 507 the question and answer form is sent to the client for completion and return. At step 509 the user fills in the form and includes the populated form in a reply. At step 508 the SW agent stores the question and answer data into the navigation template/response to store in the database for future use. At step 510 the process ends for that client. In a subsequent login attempt the SW agent has the question and answers data and can populate the form on behalf of the user until the questions and answers are changed, which would require a repeat of the process involving the client response.

If at step 502 there is a virtual keypad image but at step 504 there is no questions and answers form, then at step 506 the virtual keypad image is processed and decomposed as previously described to isolate and identify the individual characters present in the image. The image data is also encoded as base 64, or some other format string at step 504, and stored in a navigation template at step 508. The process then ends at step 510 for that client.

It is possible that both steps 502 and 504 are not true. In this case the process moves directly to step 510 and the process ends. It is also possible that both steps 502 and 504 are true incorporating both side branches (step 503) and (steps 505, 507, and 509) of the process and all of the steps of the main branch including steps 506 and 508.

In one embodiment CAPTCHA technology might be used in combination with a virtual keypad interface. If this is the case, the CAPTCHA characters may be identified by the authentic user of the site in a process similar to filling a question and answer form.

It will be apparent to one with skill in the art that the automated login system of the invention may be provided using some or all of the mentioned features and components without departing from the spirit and scope of the present invention. It will also be apparent to the skilled artisan that the embodiments described above are specific examples of a single broader invention which may have greater scope than any of the singular descriptions taught. There may be many alterations made in the descriptions without departing from the spirit and scope of the present invention.

What is claimed is:

1. A processor connected to a computer readable memory storing and executing software for performing an automated network-based login procedure on a virtual interactive keypad image comprising:
   a software agent, provided by the software, executable from the processor connected to the network for automatically navigating to a login page, on behalf of a user, accessing the keypad image, and performing an automated login; and
   an automated login support application, provided by the software, the support application including at least an image processor, an optical character recognizer, and an image data encoder and decoder for discerning characters;
   characterized in that the virtual keypad image includes randomly placed characters that must be selected in an order of a client's specific set of credential characters for successful login and the software agent performs a login at the virtual keypad image based on functions of the automated login support application including at least sequential character image matching, according to the order, and location information acquisition for each character of the client's specific set of credential characters included in the image of the keypad.

2. The processor of claim 1 wherein the network is the Internet network.

3. The processor of claim 1 wherein the keypad image includes the credential characters of a client and other random characters.

4. The processor of claim 1 wherein image data processed by the image processor is encoded to 64 base string or some other feasible encoding format.

5. The processor of claim 1 wherein the keypad image is mathematically sectioned to isolate individual characters in the image resulting in multiple character images.

6. The processor of claim 5 wherein the keypad image is converted into a grayscale image before mathematical sectioning of the image to isolate the characters.

7. The processor of claim 1 wherein the location information corresponds to character position in the virtual keypad image.

8. The processor of claim 1 wherein characters in the keypad image are identified by character name and the location of the character in the keypad image.

9. The processor of claim 1 wherein the image data decoder returns image data in 64 base string in extensible markup language (XML) format.

10. The processor of claim 1 wherein a specific set of credential characters representing a pass code or password are extracted from a navigation template to match them with characters processed from the keypad image to obtain the identification and location of those characters in the keypad image.

* * * * *